US011454952B2

(12) United States Patent
Sueda et al.

(10) Patent No.: US 11,454,952 B2
(45) Date of Patent: Sep. 27, 2022

(54) NUMERICAL CONTROL APPARATUS

(71) Applicant: Mitsubishi Electric Corporation, Tokyo (JP)

(72) Inventors: Takashi Sueda, Tokyo (JP); Keishi Nagae, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/626,497

(22) PCT Filed: Sep. 12, 2019

(86) PCT No.: PCT/JP2019/035922
§ 371 (c)(1),
(2) Date: Jan. 12, 2022

(87) PCT Pub. No.: WO2021/048976
PCT Pub. Date: Mar. 18, 2021

(65) Prior Publication Data
US 2022/0244706 A1  Aug. 4, 2022

(51) Int. Cl.
G05B 19/4155 (2006.01)
G05B 19/414 (2006.01)
(52) U.S. Cl.
CPC ....... *G05B 19/414* (2013.01); *G05B 19/4155* (2013.01)
(58) Field of Classification Search
None
See application file for complete search history.

(56) References Cited

U.S. PATENT DOCUMENTS 5,008,834 A    4/1991  Mizuno et al.
10,520,913 B2  12/2019  Sasaki
(Continued)

FOREIGN PATENT DOCUMENTS

JP   60-175111 A   9/1985
JP   63-256381 A   10/1988
(Continued)

OTHER PUBLICATIONS

International Search Report and Written Opinion dated Dec. 10, 2019, received for PCT Application PCT/JP2019/035922, Filed on Sep. 12, 2019, 7 pages including English Translation.
(Continued)

*Primary Examiner* — Ryan A Jarrett
(74) *Attorney, Agent, or Firm* — Xsensus LLP (57) ABSTRACT

A numerical control apparatus includes a processor that loads a basic function processing object in which basic function processing for executing a basic function on a control target is compiled and an additional function processing object in which additional function processing of executing an additional function on the control target is compiled, and develops an additional function processing unit and a basic function processing unit on a RAM, where the basic function processing object includes an identifier for identifying the additional function processing, and the processor develops a machining program used for controlling the control target on the RAM, accesses a location on the RAM corresponding to the identifier when there is a command to execute processing corresponding to the identifier during execution of the machining program, and executes the additional function processing corresponding to the identifier.

9 Claims, 7 Drawing Sheets

(56) References Cited

U.S. PATENT DOCUMENTS

| | | |
|---|---|---|
| 10,625,420 B2 | 4/2020 | Imanishi |
| 10,642,596 B2 | 5/2020 | Tanimoto et al. |
| 10,895,865 B2 | 1/2021 | Endou |
| 2016/0179085 A1 | 6/2016 | Seitz et al. |
| 2018/0207798 A1 | 7/2018 | Tsuzaki |
| 2018/0264651 A1 | 9/2018 | Ojima et al. |

FOREIGN PATENT DOCUMENTS

| | | |
|---|---|---|
| JP | 4-219805 A | 8/1992 |
| JP | 5-035322 A | 2/1993 |
| JP | 8-249030 A | 9/1996 |
| JP | 10-289011 A | 10/1998 |
| JP | 2000-181522 A | 6/2000 |
| JP | 3063250 B2 | 7/2000 |
| JP | 2000-235410 A | 8/2000 |
| JP | 2002-132316 A | 5/2002 |
| JP | 2005-234639 A | 9/2005 |
| JP | 2016-78142 A | 5/2016 |
| JP | 2017-156908 A | 9/2017 |
| JP | 2018-114607 A | 7/2018 |
| JP | 2018-129066 A | 8/2018 |
| JP | 2018-153883 A | 10/2018 |
| JP | 6487490 B2 | 3/2019 |
| JP | 2019-79337 A | 5/2019 |
| JP | 2019-086823 A | 6/2019 |

OTHER PUBLICATIONS

Decision to Grant dated Dec. 8, 2020, received for Japanese Application 2020-545609, 5 pages including English Translation.
Written Opposition to the Grant of Patent dated Jul. 27, 2021, received for Japanese Application 2020-545609, 35 pages.

NUMERICAL CONTROL APPARATUS

CROSS-REFERENCE TO RELATED APPLICATION

The present application is based on PCT filing PCT/JP2019/035922, filed Sep. 12, 2019, the entire contents of which are incorporated herein by reference.

FIELD

The present invention relates to a numerical control apparatus that controls an operation of a machine.

BACKGROUND

A machine such as an industrial robot is manufactured by a machine manufacturer, whereas a numerical control apparatus that controls an operation of the machine is manufactured by a numerical control apparatus manufacturer. When the machine is subjected to function expansion, it is necessary to set the function expansion also for the numerical control apparatus, and thus the machine manufacturer requests the numerical control apparatus manufacturer to perform the function expansion when performing the function expansion on the machine.

However, there is a case where the machine manufacturer wishes to perform its own function expansion setting for the numerical control apparatus. For example, there is a case where the machine manufacturer wishes to perform unique data conversion with the numerical control apparatus. A controller of Patent Literature 1 converts position data, which is received from an image processing device, from an ASCII code into a binary code handled by the controller and converts a position data request signal, which is transmitted from the controller to the image processing device, from a binary code into an ASCII code. As a result, the controller of Patent Literature 1 can exchange data with an external device having a different data format without changing software.

CITATION LIST

Patent Literature

Patent Literature 1: Japanese Patent Application Laid-open No. 2000-181522

SUMMARY

Technical Problem

However, the technique of Patent Literature 1 cannot allow for the data exchange unless the image processing device and the controller share information on the data format. The machine manufacturer has therefore not been able to customize processing content by selecting a function of the numerical control apparatus.

The present invention has been made in view of the above, and an object of the present invention is to provide a numerical control apparatus that allows a machine manufacturer to select a function of the numerical control apparatus and customize processing content.

Solution to Problem

In order to solve the above problem and achieve the object, a numerical control apparatus of the present invention includes a first storage unit that stores a basic function processing object that is an execution object obtained by compiling basic function processing for executing a basic function on a control target. The numerical control apparatus of the present invention further includes a processor that loads the basic function processing object and an additional function processing object that is an execution object obtained by compiling additional function processing of executing an additional function on the control target, and develops the basic function processing corresponding to the basic function processing object and the additional function processing corresponding to the additional function processing object on a second storage unit. The basic function processing object includes an identifier for identifying the additional function processing. The processor develops a program used to control the control target on the second storage unit, accesses a location on the second storage unit corresponding to the identifier when there is a command to execute processing corresponding to the identifier during execution of the program, and executes the additional function processing corresponding to the identifier.

Advantageous Effects of Invention

The numerical control apparatus according to the present invention has an effect that the machine manufacturer can select a function of the numerical control apparatus and customize the processing content.

DESCRIPTION OF EMBODIMENTS

A numerical control apparatus according to embodiments of the present invention will now be described below in detail with reference to the drawings. Note that the present invention is not limited to the embodiments.

First Embodiment

[Apparatus Configuration]

Figure 1:
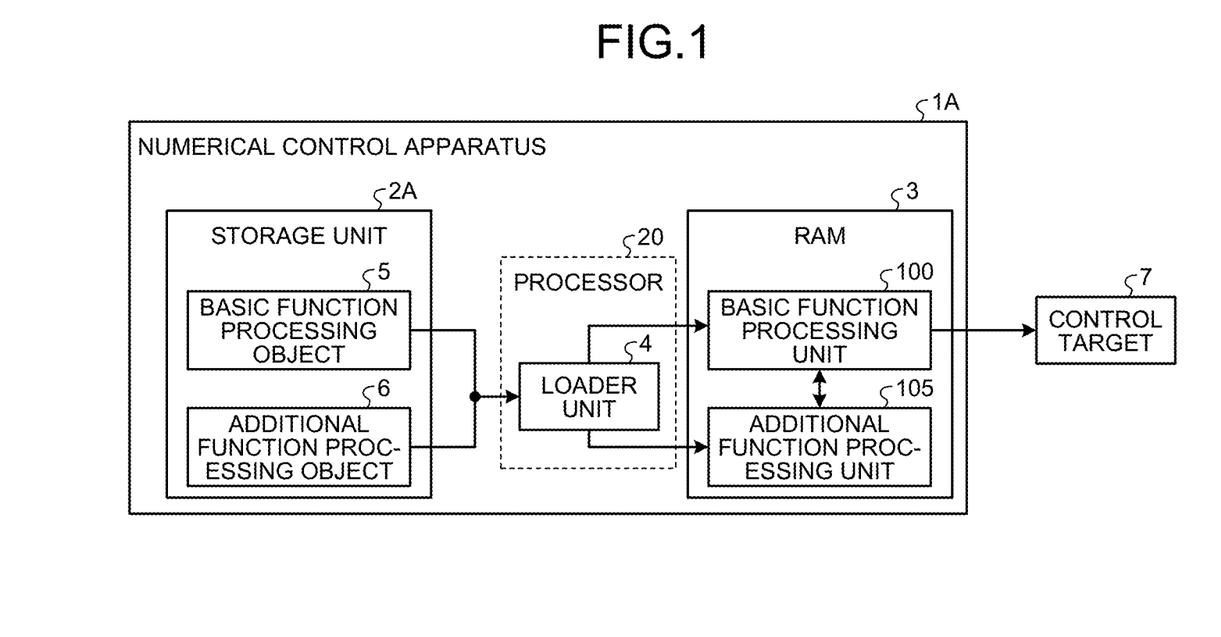
FIG. 1 is a diagram illustrating a configuration of a numerical control apparatus according to a first embodiment.

FIG. 1 is a diagram illustrating a configuration of a numerical control apparatus according to a first embodiment. A numerical control apparatus 1A includes a storage unit 2A that is a first storage unit, a random access memory (RAM) 3 that is a second storage unit, and a processor 20.

The storage unit 2A is a non-volatile memory capable of holding data stored therein even when power is not supplied to the numerical control apparatus 1A. The storage unit 2A only needs to allow the processor 20 to read the data stored therein after power is supplied to the numerical control apparatus 1A, and does not necessarily have to be attached to the same substrate as the substrate to which the RAM 3 is attached. The storage unit 2A stores a basic function processing object 5 and an additional function processing object 6. Note that the storage unit 2A also stores a machining program (a machining program 106 to be described later) used for controlling a control target 7.

The basic function processing object 5 is an object that processes basic functions of numerical control. The basic function processing object 5 is an object for reading and analyzing the machining program 106 and outputting an analysis result as a command to the control target 7. The additional function processing object 6 is an object that processes an additional function of numerical control. The additional function of the present embodiment is a function not specified in the machining program 106. The basic functions of the present embodiment are a function of analyzing the machining program, a function of moving a shaft, and the like and include, for example, the following processings (1) to (5).

(1) Interpolation processing for implementing a smooth operation from the analysis result (2) Output processing to the control target (3) Screen processing for implementing human interface (4) Communication processing with an external device (5) Programmable logic controller (PLC) processing for executing a ladder program Examples of the external device of (4) described above are a secure digital (SD) card and an Ethernet (registered trademark) device. An example of the additional function processing object 6 is coordinate conversion processing corresponding to a mechanical structure of the control target 7. The basic function processing object 5 is created by a numerical control apparatus manufacturer, and the additional function processing object 6 is created by a machine manufacturer.

The machine manufacturer stores in advance a desired additional function, an address on the RAM 3 where the additional function is stored, and an identifier (an identifier 104 to be described later) corresponding to the additional function in association with one another in the additional function processing object 6. An example of the machine manufacturer is a manufacturer of the control target 7. The machine manufacturer can customize the additional function processing. The machine manufacturer creates the machining program in limited cases where, for example, the operation of a machine such as the control target 7 is to be checked. An end user creates the machining program and uses the additional function. Note that the additional function processing is customized not only by the machine manufacturer but also by a manufacturer that makes a device or the like to be controlled by the numerical control apparatus 1A.

Moreover, the numerical control apparatus 1A executes the additional function corresponding to the identifier 104 during execution of the machining program 106.

The RAM 3 is an area in which the processor 20 stores data when the numerical control apparatus 1A executes control processing on the control target 7. Various data are stored in the RAM 3 by the processor 20.

An example of the control target 7 is a device (machine) including one or more shafts and an actuator that drives these shafts. For example, in a case where the control target 7 is a machine tool, the control target 7 includes a translational shaft or a rotational shaft that changes a relative position between a tool and a workpiece. The actuator that drives the translational shaft or the rotational shaft is a servomotor. Moreover, in the case where the control target 7 is the machine tool, the control target 7 includes a spindle that rotates the tool or the workpiece. A spindle motor that rotates the spindle is the actuator.

Alternatively, the control target 7 may be a device other than the machine tool that performs cutting. For example, the control target 7 may include a processing machine that machines a workpiece and a servomotor that controls the operation of the processing machine. The control target 7 may be a laser beam machine, a water jet processing machine, an electrical discharge machine, a metal additive manufacturing (AM) processing machine, a wood processing machine, or the like.

Alternatively, the control target 7 may be a robot instead of the machine tool. For example, the control target 7 may include a robot and a servomotor that controls the operation of the robot. In a case where the control target 7 is an industrial robot, the control target 7 includes one or more joint shafts and a servomotor as the actuator that changes the joint angles of the joint shafts. Note that in the case where the control target 7 is the industrial robot, any type of industrial robot may be used such as a vertical articulated robot, a horizontal articulated robot, or a parallel link robot.

The processor 20 includes a function of a loader unit 4 that develops the basic function processing object 5 and the additional function processing object 6 on the RAM 3, and an initialization processing function of numerical control.

When power is supplied to the numerical control apparatus 1A, the loader unit 4 reads the basic function processing object 5 and the additional function processing object 6 stored in the storage unit 2A, and develops a basic function processing unit 100 and an additional function processing unit 105 on the RAM 3, respectively.

The basic function processing unit 100 is data obtained by developing the basic function processing object 5 on the RAM 3, and defines the basic functions of numerical control. The additional function processing unit 105 is data obtained by developing the additional function processing object 6 on the RAM 3, and defines the additional function of numerical control.

As described above, the numerical control apparatus 1A includes the processor 20 and the memory. That is, some or all of the functions of the components included in the numerical control apparatus 1A can be implemented by the processor 20 and the memory.

An example of the processor 20 is a central processing unit (CPU) or a system large scale integration (LSI), the CPU being also referred to as a central processor, a processing unit, an arithmetic unit, a microprocessor, a microcomputer, a processor, or a digital signal processor (DSP).

Some functions of the numerical control apparatus 1A are implemented by the processor 20 reading and executing the machining program 106, the basic function processing object 5, and the additional function processing object 6 stored in the storage unit 2A for executing the operation of the numerical control apparatus 1A. It can also be said that the machining program 106, the basic function processing object 5, and the additional function processing object 6 cause a computer to execute a procedure or method of operation processing.

Note that the functions of the numerical control apparatus 1A may be implemented partly by dedicated hardware and partly by software or firmware.

Figure 2:
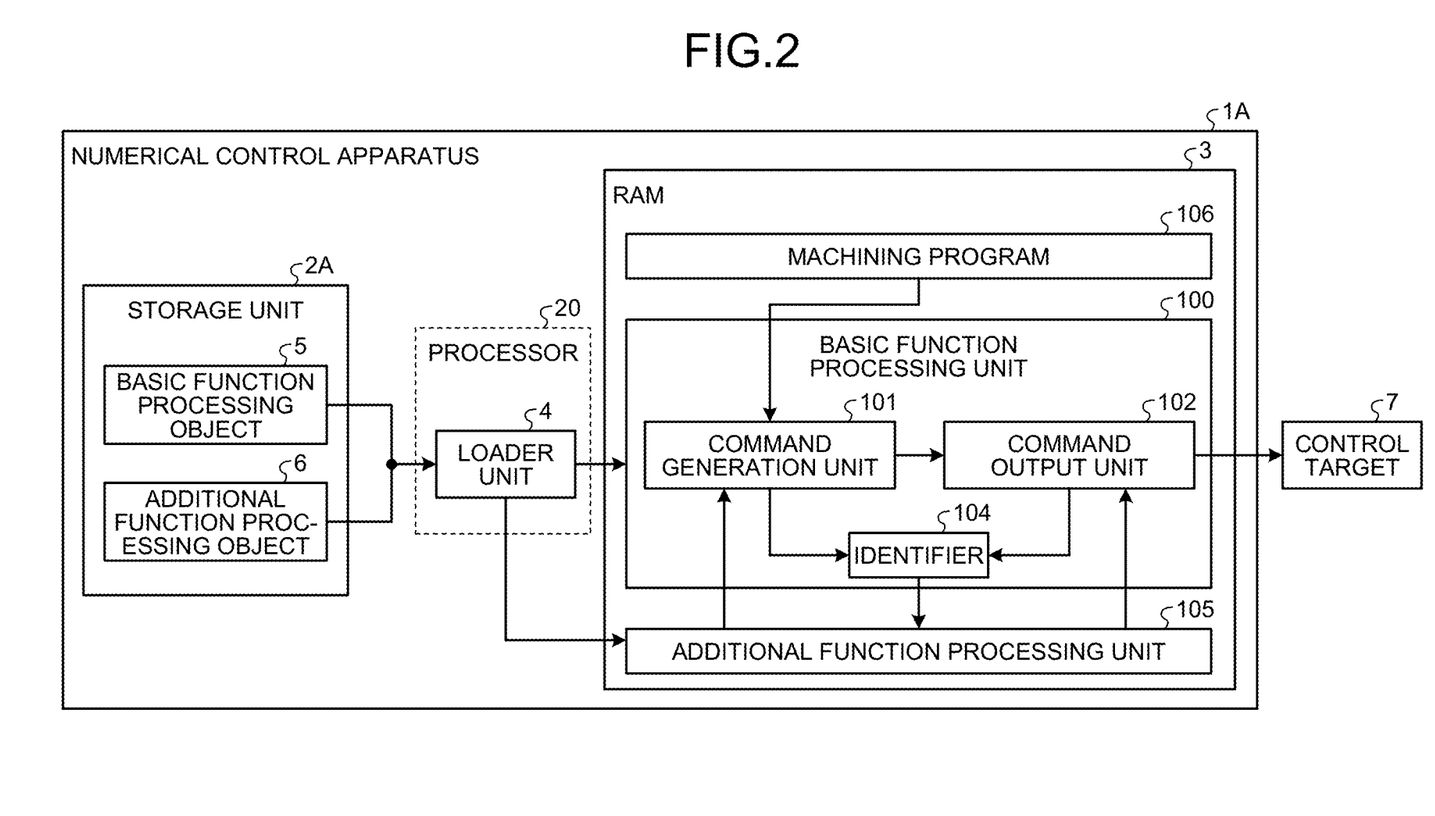
FIG. 2 is a diagram illustrating a detailed configuration of a basic function processing unit of the numerical control apparatus according to the first embodiment.

FIG. 2 is a diagram illustrating a detailed configuration of the basic function processing unit of the numerical control apparatus according to the first embodiment. The basic function processing object 5 is an executable object generated by programming and compiling the basic function processing unit 100 that is processing for implementing the basic functions of the numerical control apparatus 1A.

The basic function processing unit 100 includes a command generation unit 101 and a command output unit 102. The loader unit 4 loads the basic function processing object 5 and the additional function processing object 6 into the RAM 3.

As processing executed after the additional function processing object 6 is developed on the RAM 3, the basic function processing unit 100 is programmed with processing of searching for the identifier 104 by a global symbol name and processing of setting an address on the RAM 3 of the additional function processing unit 105 to the corresponding identifier 104. Moreover, in the basic function processing unit 100, the identifier 104 corresponding to the processing content of the additional function and processing of executing the processing described in the address on the RAM 3 set to the identifier 104 are programmed at a location in a source code for causing the additional function processing unit 105 to be executed.

The command generation unit 101 analyzes a character string of the machining program 106 and extracts content of instructions for the control target 7. The command generation unit 101 generates various commands for the control target 7 on the basis of the content of instructions for the control target 7. Here, the various commands are commands for controlling the operation of the control target 7. Examples of the various commands include a command for a servomotor, a current command for a servo amplifier that controls the servomotor, and an output signal that changes a state of a switch, a lamp, or the like. The command output unit 102 outputs the various commands generated by the command generation unit 101 to the control target 7.

The identifier 104 is data by which the additional function can be identified. That is, the identifier 104 has a one-to-one correspondence with the processing content for each processing content of the additional function processing unit 105. The numerical control apparatus manufacturer associates in advance the identifier 104 with each processing of the basic function processing unit 100. An address indicating a development area when the additional function processing unit 105 is developed on the RAM 3 is set to the identifier 104. For example, in a case of C language, when the additional function processing unit 105 is a single function, a function pointer is set to the identifier 104. The function pointer is information indicating an address on the RAM 3.

Furthermore, in a case where the additional function processing unit 105 includes a plurality of functions, the identifier 104 may be implemented as an index of an array such as a table that stores a plurality of function pointers. The index is information indicating the location of the function pointer arranged in the table, and the function pointer is information indicating the location of the function arranged on the RAM 3. Note that, instead of the index, an arrangement location of the function pointer in a structure in which the plurality of function pointers is stored may be used.

In a case where the identifier 104 is a positive numerical value such as "1", which function to call is set in the basic function processing unit 100. For example, in a case where the additional function processing unit 105 is a single function, the identifier 104 is associated with a single function pointer, so that the basic function processing unit 100 calls one function corresponding to the function pointer.

Moreover, in a case where the additional function processing unit 105 includes a plurality of functions, the identifier 104 is associated with one table pointer, so that the basic function processing unit 100 calls a table corresponding to the table pointer. In this case, an element of the table includes function pointers pointing to the plurality of functions. That is, in the case where the additional function processing unit 105 includes the plurality of functions, the basic function processing unit 100 calls the plurality of functions on the basis of the table pointer corresponding to the identifier 104 and the function pointers (indices) in the table.

The function of the additional function or the like is created in advance by the machine manufacturer in a format that can be loaded as the additional function processing unit 105 on the RAM 3 when the numerical control apparatus 1A is activated. In the case of the plurality of functions, the machine manufacturer creates in advance a table, an identifier corresponding to a table pointer, a function, and a function pointer corresponding to the function. As a result, when the numerical control apparatus 1A is activated, the table and the function are loaded on the RAM 3 as the additional function processing unit 105.

The additional function processing object 6 is an executable object generated by programming and compiling the additional function processing unit 105 that is processing necessary for implementing a function to be added. In the additional function processing object 6, an address on the RAM 3 of the additional function processing unit 105 corresponding to the identifier 104 is defined for the identifier 104. That is, the additional function processing object 6 stores a storage area (address) on the RAM 3 of the additional function corresponding to the identifier 104.

An example of processing executed by the additional function processing unit 105 includes coordinate conversion processing in a case where the control target 7 is a machine tool having a special structure different from three translational axes (X axis, Y axis, and Z axis) or two rotational axes (A axis and B axis, B axis and C axis, or C axis and A axis). For example, in a case where the control target 7 is a machine tool with a spindle including a parallel link mechanism, an example of processing executed by the additional function processing unit 105 is coordinate conversion processing that converts an operation in a coordinate system in which the machining program 106 is programmed into an operation of each axis of the parallel link mechanism.

Note that the control target 7 may be a machine tool including a link mechanism such as a pantograph mechanism or a crank slider mechanism. In a case where the additional function processing unit 105 executes the coordinate conversion as described above, the identifier 104 is set at a position where processing of forward kinematics calculation that converts a machine value of each shaft of the motor into a tool tip point, or processing of inverse kinematics calculation that is inverse processing of the processing of forward kinematics calculation is executed in the basic function processing unit 100. The setting of the identifier 104 in the basic function processing unit 100 is performed by the numerical control apparatus manufacturer. The numerical control apparatus manufacturer lists and releases specification items such as details of the additional function and an interface of the numerical control apparatus 1A corresponding to the identifier 104 being set. The interface of the numerical control apparatus 1A includes a data item to be input to the numerical control apparatus 1A and a data item to be output from the numerical control apparatus 1A.

The machine manufacturer refers to the released list and creates the additional function processing unit 105 in accordance with the specifications of a desired function. For example, in a case where the additional function is coordinate conversion, the specification items of the identifier 104 corresponding to the forward kinematics calculation include contents that the input is the machine value of each shaft of the motor, the output is a three-dimensional position of the tool tip point and the orientation of the tool, and the machine manufacturer creates processing for connecting the input and the output. An example of the processing for connecting the input and the output is arithmetic processing using a function. That is, the machine manufacturer sets a function for connecting the input and the output. As a result, the machine manufacturer can uniquely set a desired function.

As described above, the numerical control apparatus manufacturer releases the list of the identifiers 104 and explains, to the machine manufacturer, what type and additional function processing each identifier 104 is associated with. The machine manufacturer selects an appropriate identifier 104 according to the details of the additional function to be added, and associates the identifier 104 with the address (such as the function pointer) of the additional function processing. Note that it is not essential to make any modification to the machining program 106 in order to execute the additional function processing. The numerical control apparatus 1A determines whether or not to execute the additional function processing on the basis of whether or not the additional function processing object 6 has been loaded or whether or not the identifier 104 has been found. That is, the same machining program 106 results in different operations depending on the presence or absence of the additional function processing object 6.

In a case where the control target 7 is other than the machine tool that performs cutting such as a laser beam machine, a water jet processing machine, an electrical discharge machine, an AM processing machine, or a wood processing machine, another example of the processing executed by the additional function processing unit 105 includes processing of implementing a control function that is required depending on each processing method. Other examples of the processing executed by the additional function processing unit 105 include processing of implementing an operation for the purpose of adjusting a machine, processing of implementing an operation for the purpose of testing a machine, processing of implementing an operation for the purpose of maintenance and inspection of a machine, and processing of implementing a data collection function.

In a case where the control target 7 is a laser beam machine, an example of the processing executed by the additional function processing unit 105 is processing of controlling an optical drive device that controls laser light. Moreover, in a case where the control target 7 is not a machine tool but an industrial robot, an example of the processing executed by the additional function processing unit 105 is coordinate conversion processing for converting the operation of changing the position and angle of a hand of the industrial robot instructed by the machining program 106 into the operation of each joint shaft of the industrial robot. The industrial robot may be a robot having any structure such as a vertical articulated robot, a horizontal articulated robot, or a parallel link robot. The additional function processing unit 105 transmits the processing result to the command generation unit 101 or the command output unit 102.

The machining program 106 is a program in which the processing content to be executed by the control target 7 is described. When the numerical control apparatus 1A executes the machining program 106, the processing described in the machining program 106 is executed by the control target 7.

The machining program 106 is, for example, a data file described with a character string in a certain format. Note that the numerical control apparatus 1A may read, as the machining program 106, a physical paper tape, film, or the like with a hole made according to a certain rule in the form of data.

Examples of the format of the machining program 106 in a case where the control target 7 is a machine tool include formats specified in Japanese Industrial Standards (JIS) B 6315-1 and JIS B 6315-2. Moreover, an example of the format of the machining program 106 in a case where the control target 7 is a robot includes the programming language SLIM specified in JIS B 8439.

[Operation Procedure]

Figure 3:
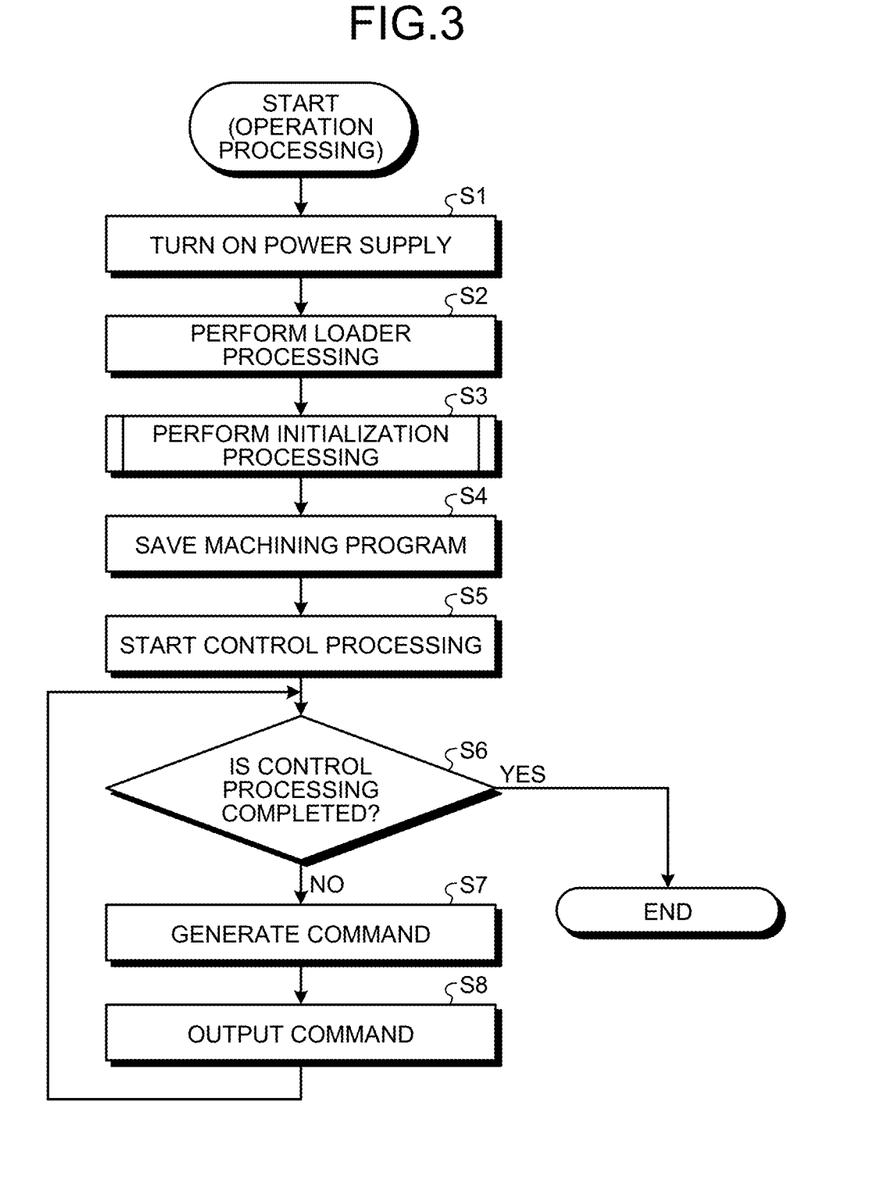
FIG. 3 is a flowchart illustrating an operation procedure of the numerical control apparatus according to the first embodiment.

FIG. 3 is a flowchart illustrating an operation procedure of the numerical control apparatus according to the first embodiment. When the numerical control apparatus 1A is powered on, power is supplied to the numerical control apparatus 1A (step S1). The loader unit 4 of the numerical control apparatus 1A executes loader processing. That is, as the loader processing, the loader unit 4 develops the basic function processing object 5 and the additional function processing object 6 on the RAM 3 from the storage unit 2A (step S2). As a result, the basic function processing unit 100 and the additional function processing unit 105 are developed on the RAM 3, and the addresses of the basic function processing unit 100 and the additional function processing unit 105 on the RAM 3 are determined.

After that, the basic function processing unit 100 starts processing, and the processor 20 performs initialization processing of numerical control (step S3). Here, a procedure of the initialization processing will be described.

Figure 4:
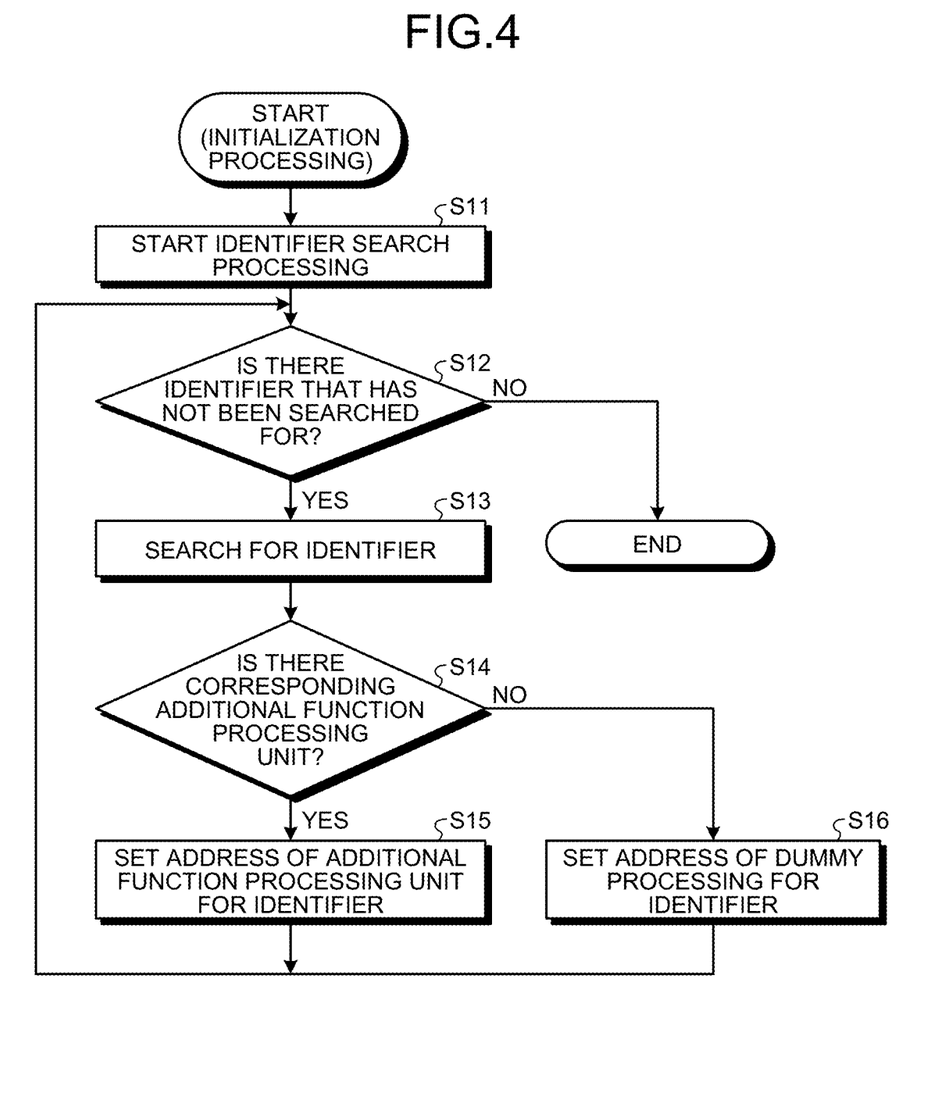
FIG. 4 is a flowchart illustrating an initialization processing procedure of numerical control by the numerical control apparatus according to the first embodiment.

FIG. 4 is a flowchart illustrating the initialization processing procedure of numerical control by the numerical control apparatus according to the first embodiment. The processor 20 starts processing of searching for the identifiers 104 set in the basic function processing unit 100 one by one (step S11). The basic function processing unit 100 determines whether or not the identifier 104 that has not been searched for is present (step S12).

If the identifier 104 that has not been searched for is present (Yes in step S12), the processor 20 searches for the identifier 104 that has not been searched for in the basic function processing unit 100 by the global symbol name (step S13). The processor 20 determines whether or not the additional function processing (additional function processing unit 105) corresponding to the retrieved identifier 104 is developed on the RAM 3 (step S14).

Moreover, in a case where the additional function processing unit 105 includes a plurality of functions and an array that stores function pointers is used, the processor 20 can acquire the function pointer corresponding to the identifier 104 by searching the array by the global symbol name and performing a search in order from the head of the array.

The processor 20 may perform the search for the identifier 104 for all the identifiers 104 described in the released list, but can avoid unnecessary search by notifying the basic function processing unit 100 in advance of information on the identifier 104 to be searched for. Examples of the notification method include a method of making the notification of the information on the identifier 104 using a parameter included in the numerical control apparatus 1A, a method of describing the information on the identifier 104 in a script in a text format that is referred to when the loader unit 4 executes the loader processing, and the like.

In the case of making the notification of the information on the identifier 104 using the parameter included in the numerical control apparatus 1A, the machine manufacturer stores in advance the parameter corresponding to the identifier 104 to be used in the storage unit 2A. For example, when using a first identifier, the machine manufacturer sets "1" to a first parameter corresponding to the first identifier, and when using a second identifier, sets "1" to a second parameter corresponding to the second identifier. When the additional function processing unit 105 is developed on the RAM 3, the processor 20 stores the parameter corresponding to the identifier 104 on the RAM 3 and determines the presence or absence of the identifier 104 on the basis of the value of the parameter stored on the RAM 3.

If the additional function processing unit 105 corresponding to the identifier 104 is developed on the RAM 3 (Yes in step S14), the processor 20 sets an address on the RAM 3 of the developed additional function processing unit 105 to the corresponding identifier 104 (step S15). As a result, the additional function processing corresponding to the identifier 104 can be executed.

If the additional function processing unit 105 corresponding to the identifier 104 is not developed on the RAM 3 (No in step S14), the processor 20 sets an address on the RAM 3 of dummy processing that does not execute any processing to the corresponding identifier 104 (step S16).

After the processing of step S15 or step S16, the processor 20 returns to step S12 and determines whether or not the identifier 104 that has not been searched for is present. The processor 20 repeats the processing of steps S12 to S16 until all the identifiers 104 have been searched for.

If the search for all the identifiers 104 has been completed with no identifier 104 that has not been searched for (No in step S12), the processor 20 ends the initialization processing of numerical control. Note that the address of the additional function on the RAM 3 may be set by the loader unit 4 when the loader unit 4 develops the additional function processing unit 105 on the RAM 3. In this case, at the time of the initialization processing, the processor 20 sets the address of the additional function processing set by the loader unit 4 to the corresponding identifier 104.

After the initialization processing of the basic function processing unit 100 is completed, that is, after the processing of step S3, the processor 20 reads the machining program 106 in which command details for the control target 7 are described from the storage unit 2A and saves the machining program in the RAM 3 (step S4).

The processor 20 instructs the basic function processing unit 100 to start control on the control target 7 using the machining program 106. As a result, the command generation unit 101 and the command output unit 102 in the basic function processing unit 100 start the control processing (step S5), and the numerical control apparatus 1A controls the control target 7 according to the command details in the machining program 106.

The command generation unit 101 determines whether or not the control processing according to the machining program 106 is completed (step S6). If the control processing is not completed (No in step S6), the command generation unit 101 generates a command for the control target 7 on the basis of the command details in the machining program 106 (step S7). The command output unit 102 outputs the command generated by the command generation unit 101 to the control target 7 (step S8).

In steps S7 and S8, the processing in the address on the RAM 3 set to the identifier 104 is executed when the processing of the command generation unit 101 and the command output unit 102 is executed. That is, when the turn has come for a specific command to be executed during the execution of the machining program 106, the command generation unit 101 searches the basic function processing unit 100 for the identifier 104 corresponding to the specific command and reads, from the RAM 3, the additional function corresponding to the identifier 104 that has been searched for. The command generation unit 101 generates a command corresponding to the additional function read from the RAM 3, and the command output unit 102 outputs the generated command to the control target 7. As described above, the numerical control apparatus 1A executes the additional function processing corresponding to the identifier 104 and reflects the additional function in the command for the control target 7.

After that, the processor 20 returns to step S6. The command generation unit 101 then determines whether or not the control processing according to the machining program 106 is completed (step S6). The processor 20 repeats the processing of steps S6 to S8 until the control processing is completed. If the control processing is completed (Yes in step S6), the processor 20 completes the operation processing.

Now, the machine manufacturers that manufacture machines such as processing machines and robots manufacture products including mechanical structures or functions that other manufacturers do not have through development of their own technologies or accumulation of know-how, and attempt to differentiate them from products manufactured by other manufacturers. In the case where the machine manufacturer manufactures a machine incorporating its own technology or know-how, there is a case where it is desired to perform function expansion with a function uniquely customized in addition to the function provided by the numerical control apparatus manufacturer as a standard. The function expansion for the numerical control apparatus may involve a change in software, which has been able to be performed only by the numerical control apparatus manufacturer. Therefore, the machine manufacturer has requested function development to the numerical control apparatus manufacturer.

However, in a case where many machine manufacturers request function expansions different from one another, the numerical control apparatus manufacturer cannot always respond to all the requests. Moreover, in a case where technical information held by the machine manufacturer is indispensable for the requested function expansion, if the technical information is confidential, there occurs additional work such as conclusion of a non-disclosure agreement between the numerical control apparatus manufacturer and the machine manufacturer. Due to such circumstances, the development by the machine manufacturer has sometimes been delayed.

In the present embodiment, the basic function processing object 5 includes the identifier 104 for identifying the additional function processing defined by the additional function processing object 6. Also, when there is a command to execute processing corresponding to the identifier 104 during the execution of the machining program 106, the processor 20 of the numerical control apparatus 1A accesses the location on the RAM 3 corresponding to the identifier 104 and executes the additional function processing corresponding to the identifier 104. As a result, a user of the numerical control apparatus 1A such as the machine manufacturer can uniquely customize the function of the numerical control apparatus 1A without requesting the numerical control apparatus manufacturer to change the software. That is, the machine manufacturer can cause the numerical control apparatus 1A to execute desired additional function processing by setting the desired additional function processing in the additional function processing object 6, setting the processing of linking the identifier 104 and the address on the RAM 3 of the additional function processing, and setting a specific command for executing processing corresponding to the identifier 104 at a location where the additional function processing is to be executed in the machining program 106. As described above, the machine manufacturer can create software processing (the additional function processing object 6) for implementing the function that the machine manufacturer wishes to uniquely customize, and add the software processing to the numerical control apparatus 1A. This accelerates the speed at which each machine manufacturer puts a processing machine or a robot utilizing its own technology or know-how into the market. For example, the machine manufacturer can create the additional function processing object 6 that implements its own technology or know-how regarding a mechanical structure as an additional function, and add the additional function processing object 6 to the numerical control apparatus 1A.

Effects of First Embodiment

As described above, in the first embodiment, the basic function processing unit 100 includes the identifier 104, and when there is a command to execute processing corresponding to the identifier 104 during the execution of the machining program 106, the processor 20 accesses the location on the RAM 3 corresponding to the identifier 104 and executes the additional function processing corresponding to the identifier 104. The identifier 104 and the additional function processing can be set by the machine manufacturer at its choice. As a result, the additional function can be incorporated into the numerical control apparatus 1A without changing or recompiling the basic function processing object 5.

Moreover, the machine manufacturer can uniquely add the additional function by uniquely creating the additional function processing object 6 and saving the additional function processing object 6 in advance in the storage unit 2A without requesting the numerical control apparatus manufacturer to change the basic function processing object 5. That is, the machine manufacturer can uniquely add the additional function to the numerical control apparatus 1A. Also, the numerical control apparatus manufacturer receives fewer requests for adding the additional function from the machine manufacturer, and thus can invest developers or cost in the function expansion of the basic function processing.

Second Embodiment

Next, a second embodiment of the present invention will be described with reference to FIG. 5. In the second embodiment, the additional function processing object 6 is stored in advance in an external device connected to a numerical control apparatus. The numerical control apparatus reads the additional function processing object 6 from the external device and executes control of the control target 7.

[Apparatus Configuration]

Figure 5:
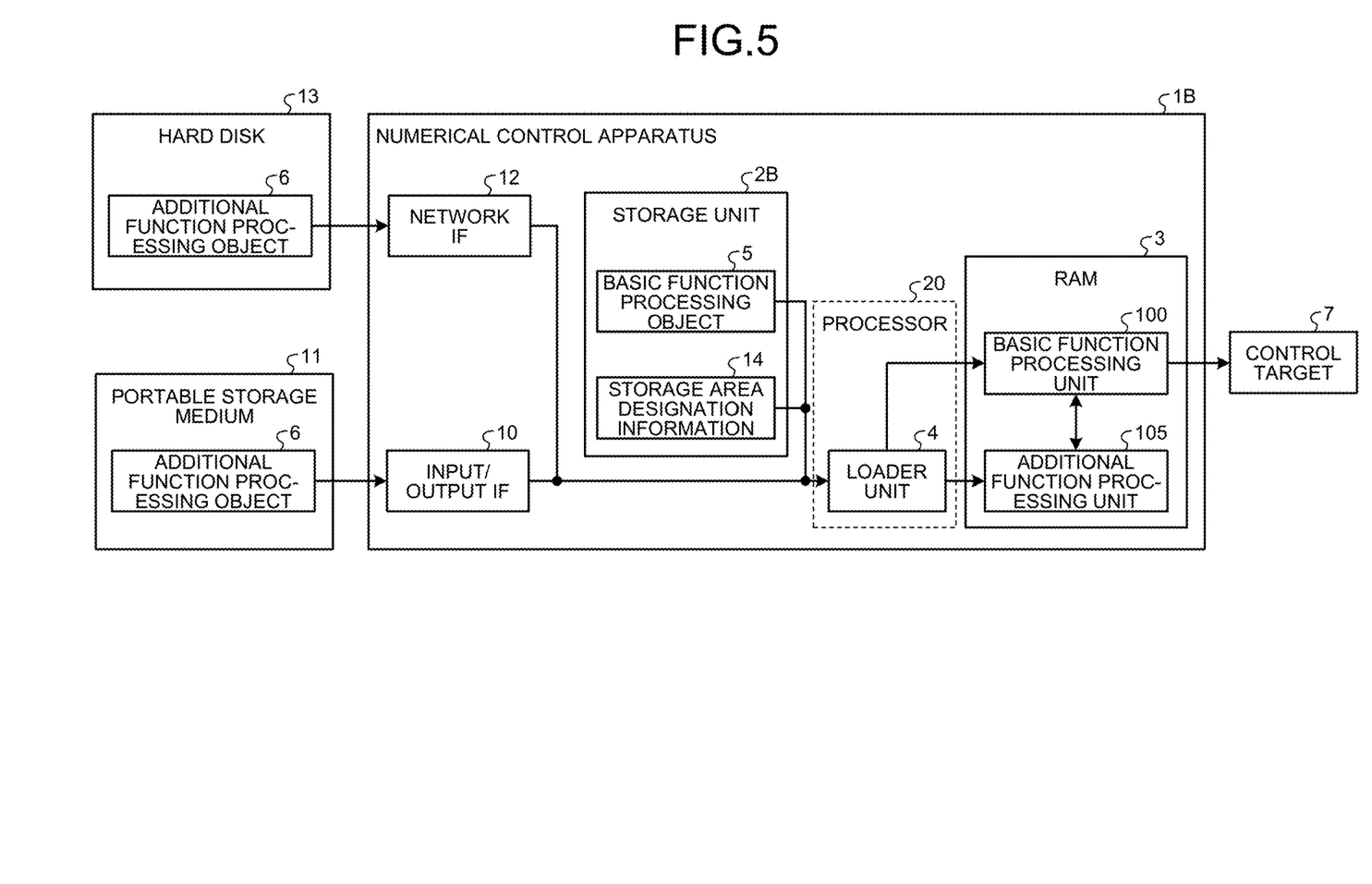
FIG. 5 is a diagram illustrating a configuration of a numerical control apparatus according to a second embodiment.

FIG. 5 is a diagram illustrating a configuration of the numerical control apparatus according to the second embodiment. Components in FIG. 5 that achieve the same functions as those of the numerical control apparatus 1A of the first embodiment illustrated in FIG. 1 are assigned the same reference numerals as those in FIG. 1, and thus redundant description will be omitted.

A numerical control apparatus 1B includes a storage unit 2B, the RAM 3, the loader unit 4, a network interface (IF) 12, and an input/output IF 10.

The network IF 12 is connected to the loader unit 4. The network IF 12 is also connected to a hard disk 13 disposed outside the numerical control apparatus 1B. The hard disk 13 stores the additional function processing object 6, and the additional function processing object 6 is read by the network IF 12.

The input/output IF 10 is connected to the loader unit 4. The input/output IF 10 is also connected to a portable storage medium 11 disposed outside the numerical control apparatus 1B. The portable storage medium 11 stores the additional function processing object 6, and the additional function processing object 6 is read by the input/output IF 10.

As described above, the area in which the additional function processing object 6 is stored may be the hard disk 13 connected via the network IF 12 or the portable storage medium 11 connected via the input/output IF 10. Note that the additional function processing object 6 need only be stored in at least one of the hard disk 13 and the portable storage medium 11.

Examples of the portable storage medium 11 include a CF card (CF memory card), an SD card, a universal serial bus (USB) memory, and the like, but may be another type of storage medium as long as the input/output IF 10 supports the storage medium. Moreover, an example of the hard disk 13 may be a hard disk or the like disposed in a server on a network, or may be a hard disk or the like in a personal computer (PC) on a network.

The storage unit 2B of the numerical control apparatus 1B stores the basic function processing object 5 and storage area designation information 14. The storage area designation information 14 includes read destination information necessary for the loader unit 4 to read the additional function processing object 6 from an area other than the storage unit 2B. That is, the storage area designation information 14 includes, as the read destination information, the location (address or the like) of the storage area in which the additional function processing object 6 is stored.

The storage area designation information 14 is information set by the machine manufacturer. The machine manufacturer stores the additional function processing object 6 in a desired external device, and sets in advance the address of the external device being the storage destination in the storage area designation information 14. An example of the machine manufacturer is a manufacturer of the control target 7.

An example of the storage area designation information 14 is a parameter provided in the numerical control apparatus 1B. In addition, the storage area designation information 14 may be a script read by the loader unit 4 before execution of load processing.

The loader unit 4 of the present embodiment reads the additional function processing object 6 from the hard disk 13 or the portable storage medium 11 on the basis of the read destination information designated in the storage area designation information 14, and develops the additional function processing object 6 on the RAM 3 as the additional function processing unit 105.

[Operation Procedure]

The operation procedure of the numerical control apparatus 1B is as described in FIG. 3 as with the numerical control apparatus 1A of the first embodiment. The difference between the operation procedure of the numerical control apparatus 1B and the operation procedure of the numerical control apparatus 1A is the loader processing in step S2. In the numerical control apparatus 1B, the loader unit 4 reads the additional function processing object 6 from the portable storage medium 11 or the hard disk 13 according to the storage area designation information 14, and develops the additional function processing object 6 on the RAM 3. As a result, the address of the additional function processing unit 105 on the RAM 3 is determined.

[Effects of Second Embodiment]

As described above, according to the second embodiment, the additional function processing object 6 can be stored in the external device such as the hard disk 13 and the portable storage medium 11, so that the storage destination of the additional function processing object 6 can be selected. This can offer a flexible method of implementing the additional function according to the usage of the numerical control apparatus 1B.

Third Embodiment

Next, a third embodiment of the present invention will be described with reference to FIG. 6. In the third embodiment, the storage unit stores in advance a plurality of the additional function processing objects 6, and the loader unit 4 selects the additional function processing object 6 designated by the machine manufacturer from the plurality of the additional function processing objects 6 and develops the additional function processing object 6 on the RAM 3.

[Apparatus Configuration]

Figure 6:
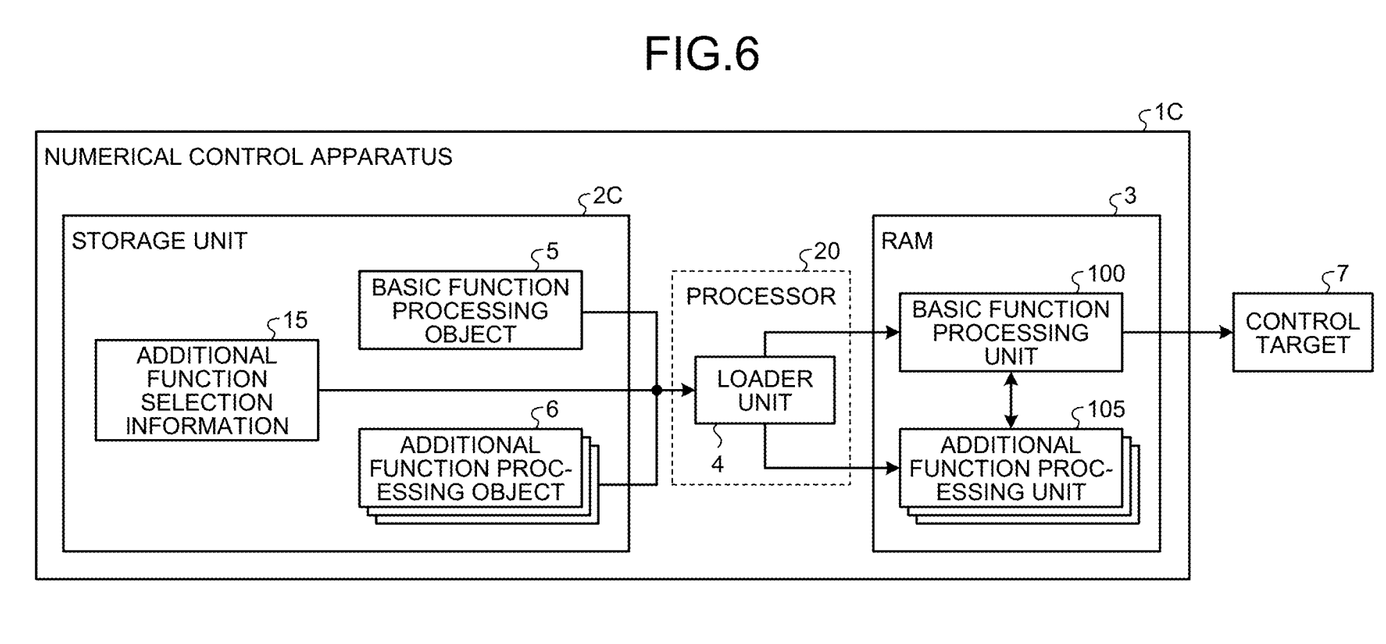
FIG. 6 is a diagram illustrating a configuration of a numerical control apparatus according to a third embodiment.

FIG. 6 is a diagram illustrating a configuration of a numerical control apparatus according to the third embodiment. Components in FIG. 6 that achieve the same functions as those of the numerical control apparatus 1A of the first embodiment illustrated in FIG. 1 are assigned the same reference numerals as those in FIG. 1, and thus redundant description will be omitted.

A numerical control apparatus 1C includes a storage unit 2C, the RAM 3, and the processor 20. The storage unit 2C stores the basic function processing object 5 and a plurality of the additional function processing objects 6 different from each other. A different additional function is set in each of the additional function processing objects 6. The storage unit 2C also stores additional function selection information 15 designating the additional function processing object 6.

The additional function selection information 15 includes information designating one or more of the additional function processing objects 6 selected by the machine manufacturer from the plurality of the additional function processing objects 6. The additional function selection information 15 is information set by the machine manufacturer. The machine manufacturer selects the additional function processing object 6 that is available and that the machine manufacturer wishes to use among the additional function processing objects 6, and sets the selected additional function processing object 6 in the additional function selection information 15 in advance. An example of the machine manufacturer is a manufacturer of the control target 7.

An example of the additional function selection information 15 includes a parameter provided in the numerical control apparatus 1C. The additional function selection information 15 may be a script to be read by the loader unit 4 before execution of the load processing.

The loader unit 4 of the present embodiment reads the additional function processing object 6 selected in the additional function selection information 15 from the storage unit 2C, and develops the additional function processing object 6 on the RAM 3 as the basic function processing unit 100 additional function processing unit 105.

[Operation Procedure]

The operation procedure of the numerical control apparatus 1C is as described in FIG. 3 as with the numerical control apparatus 1A of the first embodiment. The difference between the operation procedure of the numerical control apparatus 1C and the operation procedure of the numerical control apparatus 1A is the loader processing in step S2. In the numerical control apparatus 1C, the loader unit 4 reads one or a plurality of the additional function processing objects 6 selected in the additional function selection information 15 from the storage unit 2C, and develops the additional function processing objects 6 on the RAM 3. As a result, the addresses of the one or plurality of the additional function processing units 105 on the RAM 3 are determined.

Effects of Third Embodiment

As described above, according to the third embodiment, only the necessary additional function processing object 6 can be selected and read from among the plurality of the additional function processing objects 6 stored in the storage unit 2C. This as a result can save time and effort to delete the additional function processing object 6 that is unnecessary from the storage unit 2C every time a necessary additional function is changed or to add the additional function processing object 6 deleted once to the storage unit 2C again.

Fourth Embodiment

Next, a fourth embodiment of the present invention will be described with reference to FIG. 7. In the fourth embodiment, the basic function processing unit 100 analyzes the format of the machining program 106, and the additional function processing unit 105 performs analysis corresponding to the format of the machining program 106.

[Apparatus Configuration]

Figure 7:
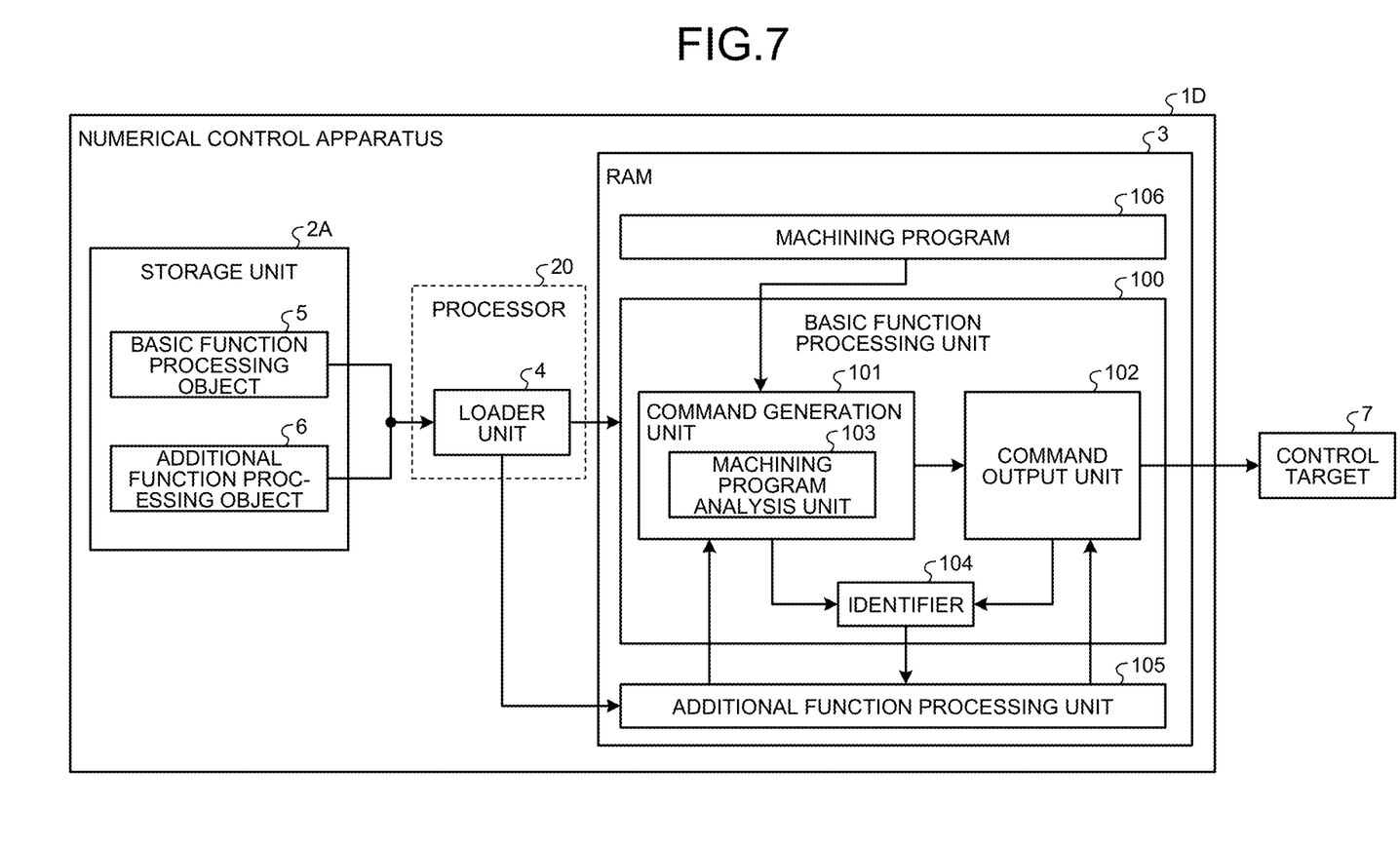
FIG. 7 is a diagram illustrating a detailed configuration of a numerical control apparatus according to a fourth embodiment.

FIG. 7 is a diagram illustrating a detailed configuration of a numerical control apparatus according to the fourth embodiment. Components in FIG. 7 that achieve the same functions as those of the numerical control apparatus 1A of the first embodiment illustrated in FIG. 1 are assigned the same reference numerals as those in FIG. 1, and thus redundant description will be omitted.

The command generation unit 101 developed on the RAM 3 of a numerical control apparatus 1D includes a machining program analysis unit 103. The machining program analysis unit 103 analyzes the format of the machining program 106.

The format of the machining program 106 includes ones defined in JIS B 6315-1 and JIS B 6315-2 in a case where the control target 7 is a machine tool, for example. In addition to these, the format may be a format subjected to function expansion for each numerical control apparatus manufacturer and machine manufacturer.

Moreover, the format of the machining program 106 in a case where the control target 7 is a robot may be, for example, the programming language SLIM defined in JIS B 8439 or may be a unique format for each machine manufacturer.

The machining program analysis unit 103 is programmed with the identifier 104 corresponding to the format of the machining program 106 and processing of executing the processing in the address on the RAM 3 set to the identifier 104. In the machining program analysis unit 103, the identifier 104 is associated with the format of the machining program 106, and the machining program analysis unit 103 determines the identifier 104 corresponding to the format of the machining program 106.

The machine manufacturer creates in advance the machining program 106 in a desired format. Moreover, the machine manufacturer programs in advance processing of analyzing the machining program 106 created in the desired format in the additional function processing object 6. The machine manufacturer also programs in advance processing of associating the identifier 104 with the format of the machining program 106 in the additional function processing object 6.

The machining program 106 analyzed by the machining program analysis unit 103 is different for each numerical control apparatus manufacturer or machine manufacturer. That is, the machining program 106 is described in a format subjected to function expansion uniquely by the numerical control apparatus manufacturer or machine manufacturer, or in a unique format. The additional function processing unit 105 analyzes the character string of the machining program 106 according to a specific format, and sets information necessary for generating a command. Examples of the information necessary for generating a command include the position and speed of the control target 7 and the like.

[Operation Procedure]

The operation procedure of the numerical control apparatus 1D is as described in FIG. 3 as with the numerical control apparatus 1A of the first embodiment. In the present embodiment, the machining program analysis unit 103 analyzes the format of the machining program 106 and determines the identifier 104 corresponding to the format. The machining program analysis unit 103 then reads the additional function processing unit 105 corresponding to the identifier 104 from the RAM 3, and the additional function processing unit 105 analyzes the machining program 106.

[Effects of Fourth Embodiment]

As described above, according to the fourth embodiment, the numerical control apparatus 1D that is independent of the format of the machining program 106 and is versatile can be implemented. As a result, the machining program 106 does not need to be recreated for different numerical control apparatus manufacturers, different machine manufacturers, and different control targets.

The configurations illustrated in the above embodiments merely illustrate examples of the content of the preset invention, and can thus be combined with another known technique or partially omitted and/or modified without departing from the scope of the present invention.

REFERENCE SIGNS LIST 1A to 1D numerical control apparatus; 2A to 2C storage unit; 3 RAM; 4 loader unit; 5 basic function processing object; 6 additional function processing object; 7 control target; 10 input/output IF; 11 portable portable storage medium; 12 network IF; 13 hard disk; 14 storage area designation information; 15 additional function selection information; 20 processor; 100 basic function processing unit; 101 command generation unit; 102 command output unit; 103 machining program analysis unit; 104 identifier; 105 additional function processing unit; 106 machining program.

The invention claimed is:

1. A numerical control apparatus comprising:
a first storage to store a basic function processing object that is an execution object obtained by compiling basic function processing for executing a basic function on a control target, and a machining program that is used to control the control target; and
a processor to load the basic function processing object and an additional function processing object that is an execution object obtained by compiling additional function processing of executing an additional function on the control target, and develop the basic function processing corresponding to the basic function processing object and the additional function processing corresponding to the additional function processing object on a second storage, wherein
the basic function processing object is an object that reads and analyzes the machining program to output an analysis result as a command for the control target,
the additional function processing object is an object that is able to incorporate the additional function without changing or recompiling the basic function processing object,
the basic function processing object includes an identifier for identifying the additional function processing, and
the processor develops the machining program on the second storage, accesses a location on the second storage corresponding to the identifier when there is a command to execute processing corresponding to the identifier during execution of the machining program, and executes the additional function processing corresponding to the identifier during execution of the machining program.

2. The numerical control apparatus according to claim 1, wherein
the additional function processing object is stored in an external device outside the numerical control apparatus, and
the processor reads the additional function processing object from the external device and develops the additional function processing object on the second storage.

3. The numerical control apparatus according to claim 1, wherein
the first storage stores a plurality of the additional function processing objects, and
the processor loads the additional function processing object selected by a user from the first storage.

4. The numerical control apparatus according to claim 1, wherein
the control target includes a processing machine to machine a workpiece and a servomotor to control an operation of the processing machine, and
the additional function is an additional function for the processing machine or the servomotor.

5. The numerical control apparatus according to claim 1, wherein
the control target includes a robot and a servomotor to control an operation of the robot, and
the additional function is an additional function for the robot or the servomotor.

6. The numerical control apparatus according to claim 1, wherein
   the additional function processing is coordinate conversion processing corresponding to a mechanical structure of the control target.

7. The numerical control apparatus according to claim 6, wherein
   the control target is a machine tool, and
   the additional function processing object is coordinate conversion processing of converting an operation in a coordinate system in which the machining program is programmed into an operation of the machine tool.

8. The numerical control apparatus according to claim 1, wherein
   the additional function processing is program analysis processing corresponding to a format of the machining program.

9. The numerical control apparatus according to claim 8, wherein
   the basic function processing is analysis processing of analyzing a format of the machining program, and
   the additional function processing is the program analysis processing corresponding to the format analyzed by the basic function processing object.

\* \* \* \* \*